(12) United States Patent
Nieh et al.

(10) Patent No.: US 10,877,307 B2
(45) Date of Patent: Dec. 29, 2020

(54) DISPLAY DEVICE

(71) Applicant: InnoLux Corporation, Miao-Li County (TW)

(72) Inventors: Chi-Hsuan Nieh, Miao-Li County (TW); Po-Ju Yang, Miao-Li County (TW); Yu-Chien Kao, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/392,271

(22) Filed: Apr. 23, 2019

(65) Prior Publication Data

US 2019/0353953 A1     Nov. 21, 2019

(30) Foreign Application Priority Data

May 16, 2018   (CN) .......................... 2018 1 0470653

(51) Int. Cl.
| | |
|---|---|
| *G02F 1/133* | (2006.01) |
| *G02F 1/136* | (2006.01) |
| *G02F 1/1335* | (2006.01) |
| *G02F 1/1333* | (2006.01) |
| *G02F 1/1339* | (2006.01) |
| *G02F 1/1345* | (2006.01) |

(52) U.S. Cl.
CPC ...... *G02F 1/133512* (2013.01); *G02F 1/1339* (2013.01); *G02F 1/1345* (2013.01); *G02F 1/133305* (2013.01)

(58) Field of Classification Search
CPC ..... G02F 1/133; G02F 1/136; G02F 1/133512
USPC ........................................................... 257/89
See application file for complete search history.

(56) References Cited

U.S. PATENT DOCUMENTS

| | | | | |
|---|---|---|---|---|
| 2016/0004129 A1* | 1/2016 | Yang | ................. | G02F 1/133512 349/106 |
| 2017/0285392 A1* | 10/2017 | Hirata | ................ | G02F 1/133308 |
| 2019/0302517 A1* | 10/2019 | Nakagawa | ............ | G02F 1/1368 |

* cited by examiner

*Primary Examiner* — Fazli Erdem
(74) *Attorney, Agent, or Firm* — Muncy, Geissler, Olds and Lowe, PC (57) ABSTRACT

A display device is disclosed, which includes a display area including a central region and a peripheral region. The display device includes: a first conductive line, a second conductive line, a first shielding portion and a second shielding portion. The first conductive line is disposed in the central region and extends along a first direction. The second conductive line is disposed in the peripheral region and extends along the first direction. The first shielding portion overlaps the first conductive line and comprises a first edge extending along the first direction and adjacent to the second conductive line. The second shielding portion overlaps the second conductive line and comprises a second edge extending along the first direction and away from the central region. A distance between the first conductive line and the first edge is different from a distance between the second conductive line and the second edge.

18 Claims, 6 Drawing Sheets

DISPLAY DEVICE

CROSS REFERENCE TO RELATED APPLICATION

This application claims the benefits of the Chinese Patent Application Serial Number 201810470653.4, filed on May 16, 2018, the subject matter of which is incorporated herein by reference.

BACKGROUND

1. Field

The present disclosure relates to a display device.

2. Description of Related Art

With continual advancements of the display technology, one major trend of the development of display panels is toward compactness, small thicknesses, and light weight. This explains why the mainstream display devices on the market are thin displays such as liquid-crystal displays (LCDs), organic light-emitting diode (OLED) displays, and micro inorganic LED displays. In fact, thin displays have found extensive use in our daily lives, serving nowadays as the typical display devices of mobile phones, laptop computers, cameras, music players, mobile navigation devices, television sets, and so forth.

In the conventional display device, the assembling allowance between the conductive lines (for example, the scan lines or the data lines) and the shielding portions (for example, the black matrix layer) is a single value. However, in some display devices, the aperture ratio of the display device may be reduced if the assembling allowance between the conductive lines and the shielding portions has a single value.

SUMMARY

The present disclosure provides a display device which comprises a display area, wherein the display area comprises a central region and a peripheral region. The display device comprises: a first conductive line, a second conductive line, a first shielding portion and a second shielding portion. The first conductive line is disposed in the central region and extends along a first direction. The second conductive line is disposed in the peripheral region and extends along the first direction. The first shielding portion overlaps the first conductive line and comprises a first edge, wherein the first edge extends along the first direction, and the first edge is adjacent to the second conductive line. The second shielding portion overlaps the second conductive line and comprises a second edge, wherein the second edge extends along the first direction, and the second edge is away from the central region. A distance between the first conductive line and the first edge is different from a distance between the second conductive line and the second edge.

The present disclosure further provides another display device which comprises a display area, wherein the display area comprises a central region and a peripheral region. The display device comprises: two first conductive lines, two second conductive lines, two first shielding portions and two second shielding portions. The first conductive lines are disposed in the central region and extend along a first direction, and the first conductive lines are adjacent to each other. The second conductive lines are disposed in the peripheral region and extend along the first direction, and the second conductive lines are adjacent to each other. The first shielding portions respectively overlap the first conductive lines. The second shielding portions respectively overlap the second conductive lines. A difference between a pitch of the first conductive lines and a pitch of the first shielding portions is defined as a first difference, a difference between a pitch of the second conductive lines and a pitch of the second shielding portions is defined as a second difference, and the first difference is different from the second difference.

The present disclosure further provides another display device which comprises a display area, wherein the display area comprises a first region and a second region, and a radius of curvature of the first region is greater than a radius of curvature of the second region. The display device comprises: two first conductive lines, two second conductive lines, two first shielding portions and two second shielding portions. The first conductive lines are disposed in the first region and extend along a first direction, and the first conductive lines are adjacent to each other. The second conductive lines are disposed in the second region and extend along the first direction, and the second conductive lines are adjacent to each other. The first shielding portions respectively overlap the first conductive lines. The second shielding portions respectively overlap the second conductive lines. A difference between a pitch of the first conductive lines and a pitch of the first shielding portions is defined as a first difference, a difference between a pitch of the second conductive lines and a pitch of the second shielding portions is defined as a second difference, and the first difference is different from the second difference.

Other novel features of the disclosure will become more apparent from the following detailed description when taken in conjunction with the accompanying drawings.

BRIEF DESCRIPTION OF THE DRAWINGS

FIG. 5B' is an enlarge view of a region of the display device when a user grabs the display device.

DETAILED DESCRIPTION OF EMBODIMENT

The following embodiments when read with the accompanying drawings are made to clearly exhibit the above-mentioned and other technical contents, features and/or effects of the present disclosure. Through the exposition by means of the specific embodiments, people would further understand the technical means and effects the present disclosure adopts to achieve the above-indicated objectives. Moreover, as the contents disclosed herein should be readily understood and can be implemented by a person skilled in the art, all equivalent changes or modifications which do not depart from the concept of the present disclosure should be encompassed by the appended claims.

Furthermore, the ordinals recited in the specification and the claims such as "first", "second" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation.

Furthermore, the terms recited in the specification and the claims such as "above", "over", or "on" are intended not only directly contact with the other element, but also intended indirectly contact with the other element. Similarly, the terms recited in the specification and the claims such as "below", or "under" are intended not only directly contact with the other element but also intended indirectly contact with the other element.

In addition, the features in different embodiments of the present disclosure can be mixed to form another embodiment.

Embodiment 1

Figure 1:
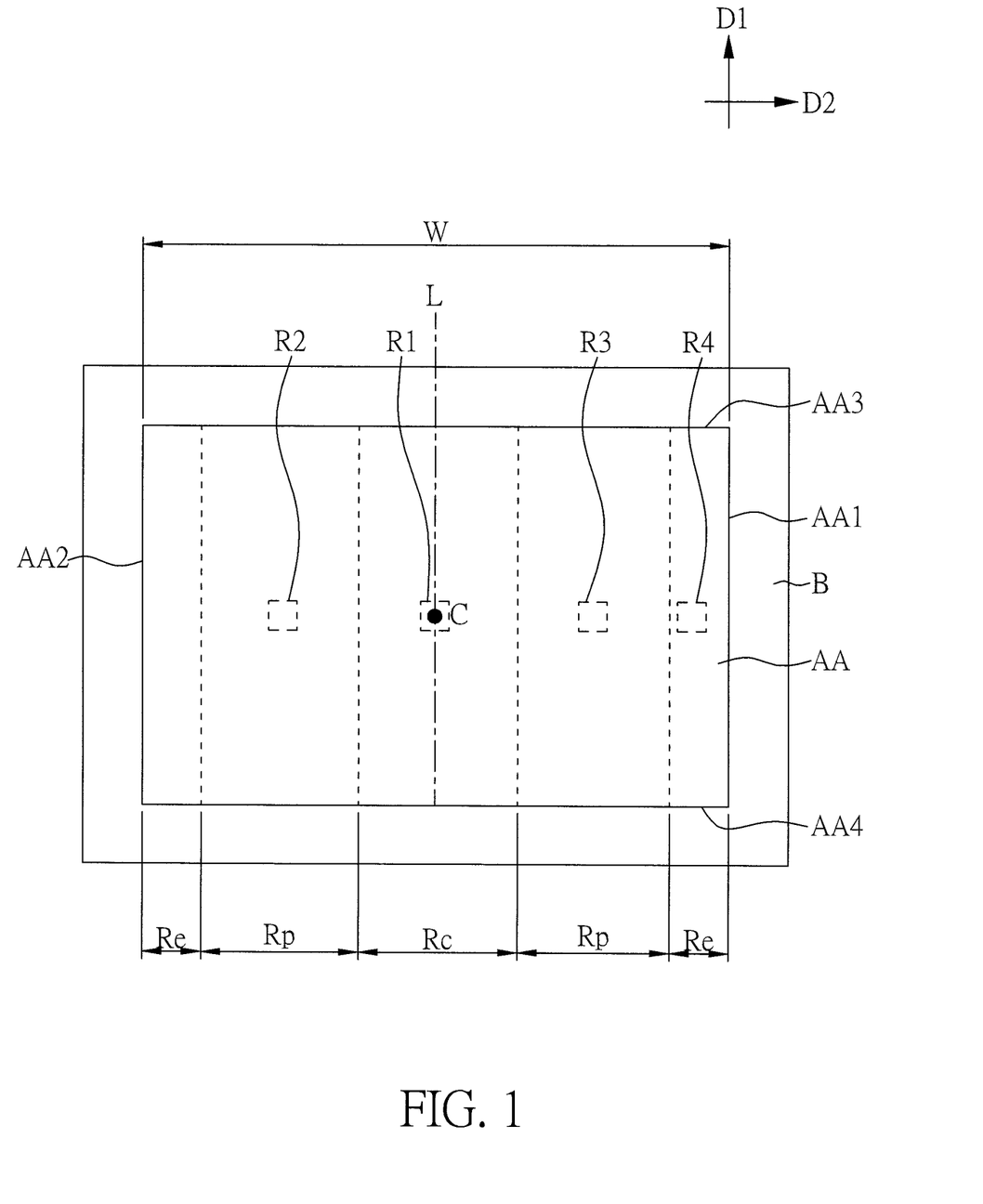
FIG. 1 is a top view of a display device according to Embodiment 1 of the present disclosure.
Figure 2A:
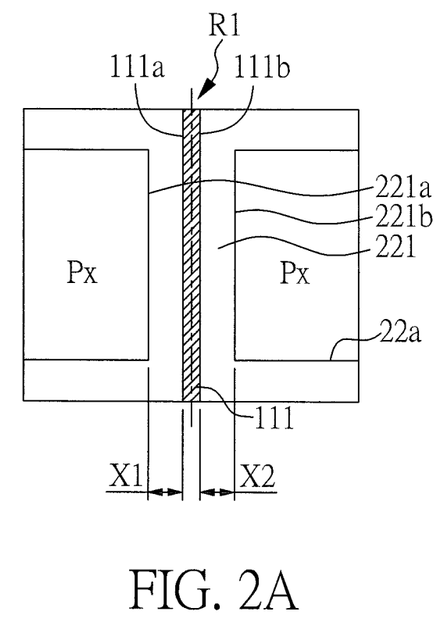
FIG. 2A to FIG. 2D are enlarged views of different regions of the display device of FIG. 1 before the display device is bent.
Figure 2B:
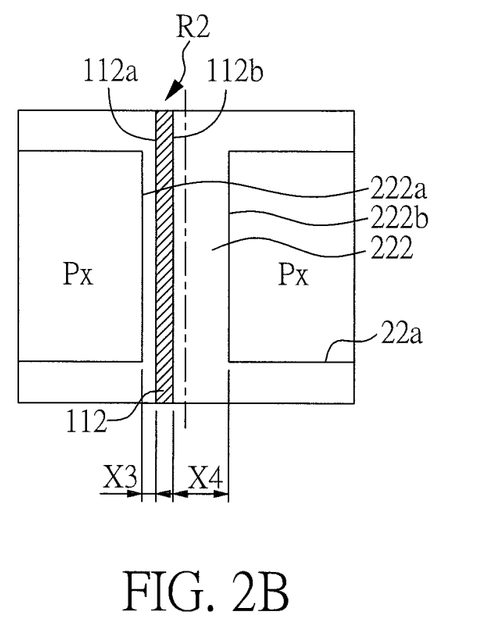
Figure 2C:
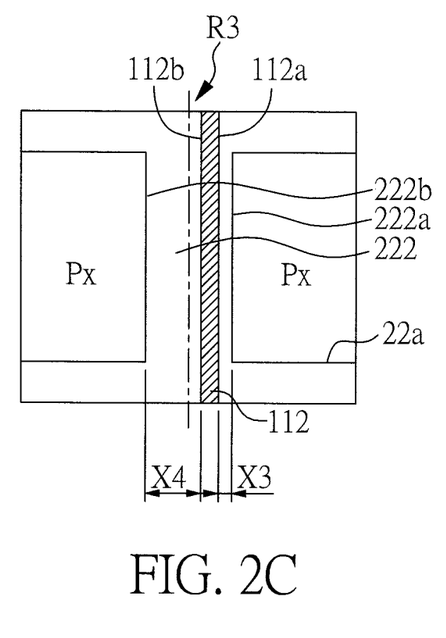
Figure 2D:
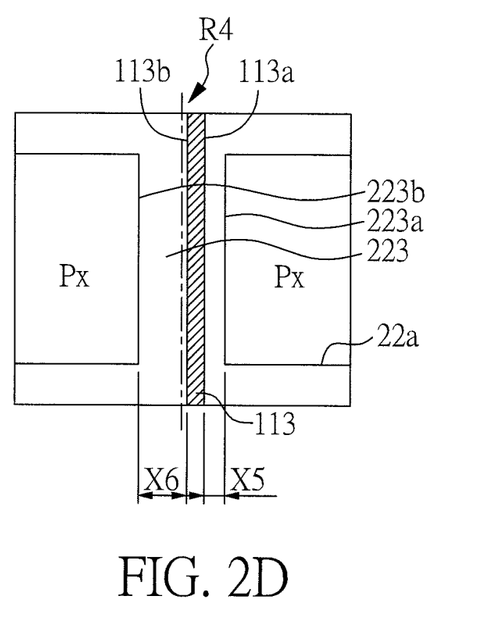
Figure 3A:
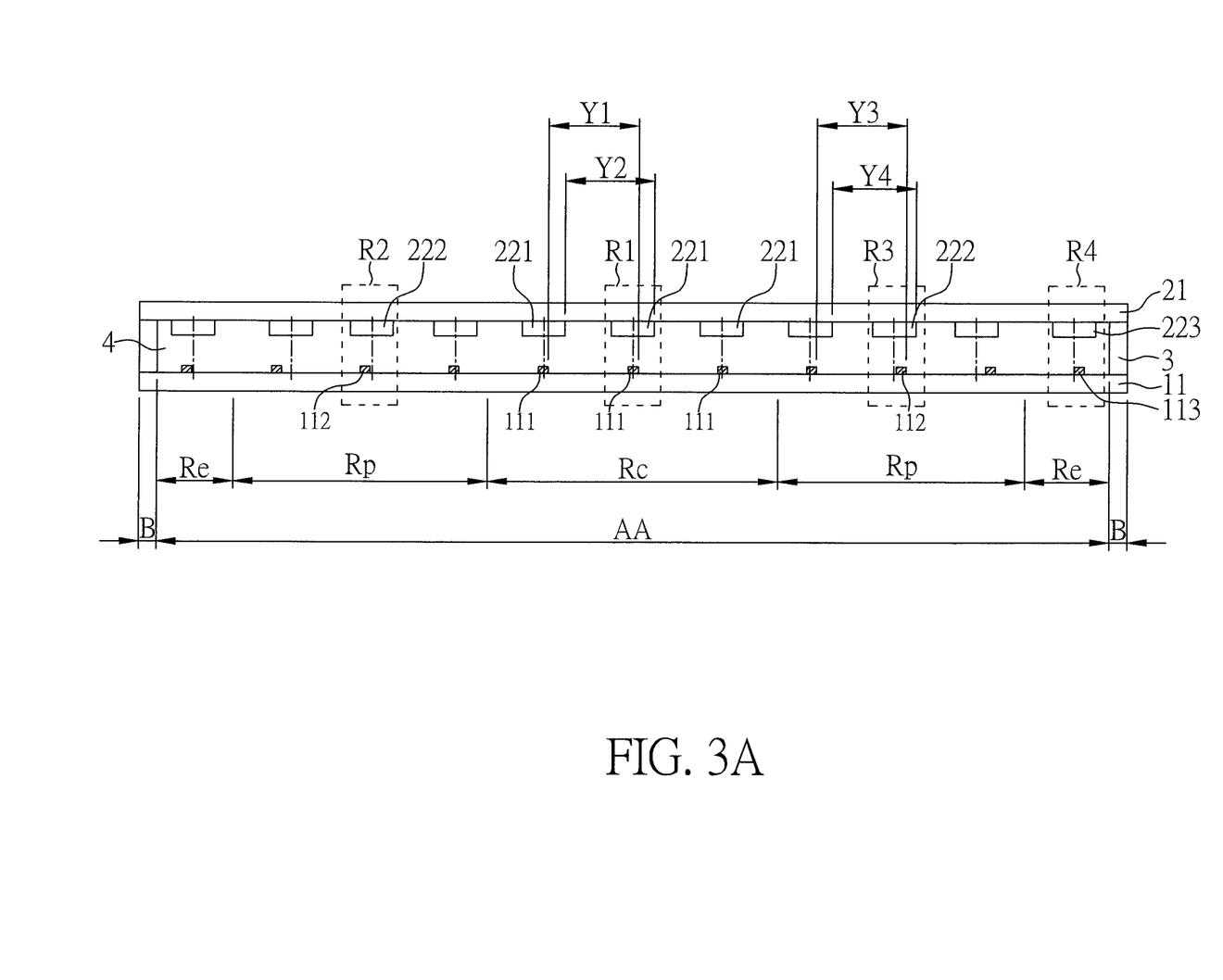
FIG. 3A is a cross-sectional view of a display device before the display device is bent according to Embodiment 1 of the present disclosure.
Figure 3B:
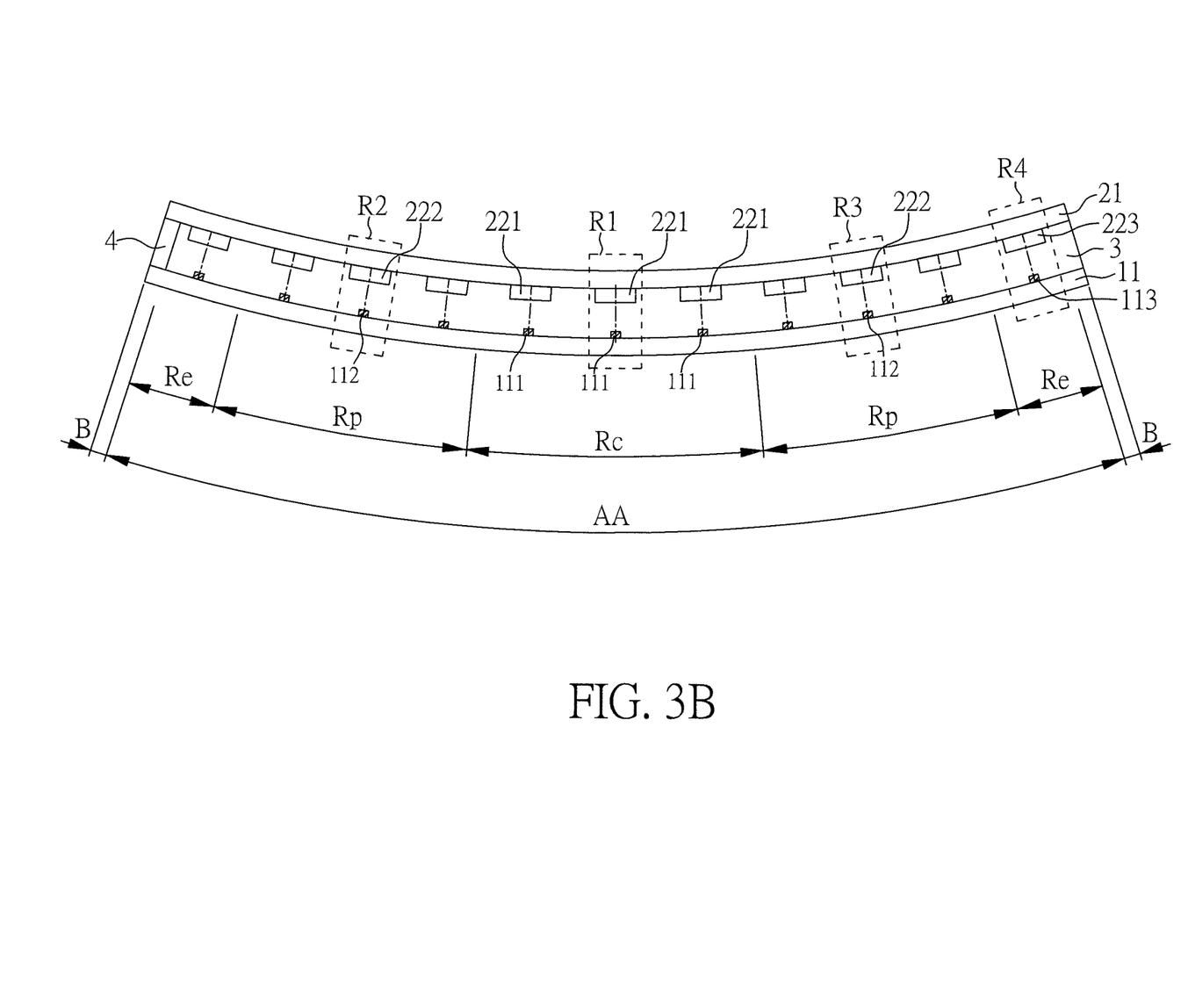
FIG. 3B is a cross-sectional view of a display device after the display device is bent according to Embodiment 1 of the present disclosure.

FIG. 1 is a top view of a display device of the present embodiment. FIG. 2A to FIG. 2D are enlarged views of different regions of the display device before the display device is assembled. FIG. 3A and FIG. 3B are respectively cross-sectional views of the display device of the present embodiment before and after the display device is assembled. In one embodiment of the present disclosure, the display device can be a flat display device. In some instances, for example, the photo spacers inside the flat display device may scratch the alignment layers, resulting in the light leakage. To shield the light leakage, the aperture ratio of the flat display device may be reduced. In one embodiment of the present disclosure, the display device can solve the problems of reduced aperture ratio caused by the light leakage. In another embodiment of the present disclosure, the display device can be a curved display device. The curved display device may have different radiuses of curvature according to the need. However, the present disclosure is not limited thereto.

The display device of the present embodiment comprises: a first substrate 11, a second substrate 21, a sealing element 3 and a display layer 4. The first substrate 11 comprises: a display area AA and a non-display area B adjacent to the display area AA. In some embodiments of the present disclosure, the display device is a seamless display device, and the display device does not comprise the non-display area B. The second substrate 21 is opposite to the first substrate 11. The sealing element 3 is disposed on the non-display area B and between the first substrate 11 and the second substrate 21. The display layer 4 is disposed on the display area AA and between the first substrate 11 and the second substrate 21. In one embodiment, the first substrate 11 and the second substrate 21 can respectively a quartz substrate, a wafer, a glass substrate, a sapphire substrate, a plastic substrate or other suitable substrates. In another embodiment, the first substrate 11 and the second substrate 21 can be a flexible substrate. The material of the plastic substrate, for example, can comprise polyimide (PI), polyethylene terephthalate (PET), polycarbonate (PC), polypropylene (PP) or a combination thereof, but the present disclosure is not limited thereto. The sealing element 3 can be a sealant or a frit. In addition, the display layer 4 may comprise liquid crystals (LCs), organic light-emitting diodes (OLEDs), quantum dots (QDs), fluorescence materials, phosphors, light-emitting diodes (LEDs), micro light-emitting diodes (micro LEDs), mini light-emitting diodes (mini LEDs) or other display medium. The structure of the display device can be adjusted when the display medium is different. However, the present disclosure is not limited thereto.

As shown in FIG. 1, the display area AA may comprise a central region Rc, a peripheral region Rp and an edge region Re. The central region Rc is disposed at the center of the display area AA. The peripheral region Rp is disposed to be adjacent to the central region Rc, but does not surround the central region Rc. The edge region Re is disposed to be adjacent to the peripheral region Rp, but does not surround the central region Rc or the peripheral region Rp. In one embodiment, two peripheral regions Rp can be disposed at two sides of the central region Rc, and the peripheral regions Rp are respectively disposed between the central region Rc and the edge regions Re. In one embodiment, a central line L of the display area AA can be defined on the basis of the central point C of the display area AA, and the central line L extends along a first direction D1. In some embodiments of the present disclosure, the central line L is a reference line locating at a center of a specific region in the display area AA. For example, when the display area comprises a flat display area and a curved display area, the central line L can be defined on the basis of a center of the curved display region, and the central region Rc, the peripheral region Rp and the edge region Re are only comprised in the curved display region. However, the present disclosure is not limited thereto. The specific region in the display area may also refer to the flat display area of the display area. In one embodiment of the present disclosure, the central region Rc, the peripheral region Rp and the edge region Re can be sequentially defined by regions extending from the central line L toward a display edge AA1 and a display edge AA2 of the display area AA. There is a width W between the display edge AA1 and the display edge AA2 along a second direction D2, and the second direction D2 can be perpendicular to the first direction D1. In some embodiments of the present disclosure, the central region Rc is a region extending from the central line L toward the display edge AA1 and the display edge AA2 of the display area AA respectively by about 20% of the width W, and a width of the central region Rc along the second direction D2 is about 30% of the width W. The peripheral region Rp is a region extending from the central region Rc toward the display edge AA1 and the display edge AA2 of the display area AA by about 20% of the width W. The edge region Re is a region extending from the peripheral region Rp toward the display edge AA1 and the display edge AA2 of the display area AA by about 15% of the width W. In another embodiment of the present disclosure, the central region Rc is a region extending from the central line L toward the display edge AA1 and the display edge AA2 of the display area AA respectively by about 10% of the width W, and a width of the central region Rc along the second direction D2 is about 20% of the width W. The peripheral region Rp is a region extending from the central region Rc toward the display edge AA1 and the display edge AA2 of the display area AA by about 35% of the width W. The edge region Re is a region extending from the peripheral region Rp toward the display edge AA1 and the display edge AA2 of the display area AA by about 5% of the width W. As shown in FIG. 1 and FIG. 3A, in some embodiments of the present disclosure, the display device can be bent by pressing the display edge AA1 and the display edge AA2 toward a direction from the first substrate 11 to the second substrate 21 or a direction from the second substrate 21 to the first substrate 11, and a curved display device can be obtained. In another embodiment of the present disclosure, the display device can be bent by pressing one of the display edge AA1 and the display edge AA2 to obtain a display device with a flat display area and a curved display area. In further another embodiment of the present disclosure, the display device can have several curved display areas. In yet another embodiment of the present disclosure, the display device can be a flat display device, which is not bent. Hereinafter, a situation in which the display device is bent by pressing the display edge AA1 and the display edge AA2 toward a direction from the first substrate 11 to the second substrate 21 is illustrated below.

However, the present disclosure is not limited thereto. In some embodiment of the present disclosure, the display device can be bent by pressing the display edge AA3 and the display edge AA4 toward a direction from the first substrate 11 to the second substrate 21 or a direction from the second substrate 21 to the first substrate 11, and a curved display device can be obtained. In another embodiment of the present disclosure, the display device can be bent by pressing one of the display edge AA3 and the display edge AA4 to obtain a display device with a flat display area and a curved display area. In further another embodiment of the present disclosure, the display device can have several curved display areas. In yet another embodiment of the present disclosure, the display device can be a flat display device, which is not bent. Herein, the definitions of the central region, the peripheral region and the edge region are similar to those illustrated before, except that the central line extends along the second direction D2, and the central region, the peripheral region and the edge region are defined by regions extending from the central line extending along the second direction D2 toward the display edge AA3 and the display edge AA4 of the display area AA.

In the conventional display device, the assembling allowance between the conductive lines (for example, the scan lines or the data lines) and the shielding portions (for example, the black matrix layer) is a single value. However, in the curved display device, if the assembling allowance between the conductive lines and the shielding portions is a single value, the aperture ratio of the curved display device may be reduced. Hence, in the display device of the present disclosure, different allowances between the conductive lines and the shielding portions are designed in different regions of the display area, so the aperture ratio of the display device can be improved.

Hereinafter, how to adjust the allowances between the conductive lines and the shielding portions in different regions such as the central region Rc, the peripheral region Rp and the edge region Re of the display device shown in FIG. 1 to improve the aperture ratio of the display device is illustrated below.

FIG. 2A to FIG. 2D are respectively enlarged views of a region R1, a region R2, a region R3 and a region R4 indicated in the display device of FIG. 1, wherein the region R1 is any one region of the central region Rc, the region R2 and the region R3 are any two regions of the peripheral region Rp, and the region R4 is any one region of the edge region Re. As shown in FIG. 1 and FIG. 2A to FIG. 2D, the display device of the present embodiment comprises: a first conductive line 111, a second conductive line 112, a first shielding portion 221 and a second shielding portion 222. The first conductive line 111 is disposed in the central region Rc and extending along the first direction D1. The second conductive line 112 is disposed in the peripheral region Rp and extending along the first direction D1. The first shielding portion 221 overlaps the first conductive line 111 and comprises a first edge 221a, and the first edge 221a extends along the first direction D1. The second shielding portion 222 overlaps the second conductive line 112 and comprises a second edge 222a, and the second edge 222a extends along the first direction D1. In addition, the display device of the present embodiment further comprises: a third conductive line 113 and a third shielding portion 223. The third conductive line 113 is disposed in the edge region Re and extends along the first direction D1. The third shielding portion 223 overlaps the third conductive line 113 and comprises a third edge 223a, and the third edge 223a extends along the first direction D1. In one embodiment of the present disclosure, the third edge 223a of the third shielding portion 223 is away from the peripheral region Rp. In another embodiment of the present disclosure, the third edge 223a is an edge of the third shielding portion 223 away from the central line L or the central point C.

In one embodiment of the present disclosure, the first conductive line 111, the second conductive line 112 and the third conductive line 113 may respectively comprise a metal, an alloy, a metal oxide, a metal oxynitride, any other electrode material or any other circuit material. For example, the first conductive line 111, the second conductive line 112 and the third conductive line 113 may respectively comprise Cu, Ag, Al, Mo, W, Au, Cr, Ni, Pt, Ti, Cu alloy, Al alloy, Mo alloy, W alloy, Au alloy, Cr alloy, Ni alloy, Pt alloy, Ti alloy, any other suitable metal, a combination thereof or any other conductive material with good conductivity or low resistance. In addition, the first conductive line 111, the second conductive line 112 and the third conductive line 113 may respectively have a single layered or multi-layered structure. However, the present disclosure is not limited thereto. Furthermore, the first shielding portion 221, the second shielding portion 222 and the third shielding portion 223 may constitute a light shielding layer which may be, for example, a black matrix layer.

More specifically, in the display device of the present embodiment, the first conductive line 111 comprises a first edge 111a and a second edge 111b. The second conductive line 112 comprises a third edge 112a and a fourth edge 112b. The third conductive line 113 comprises a fifth edge 113a and a sixth edge 113b. The first shielding portion 221 comprises a first edge 221a and a fourth edge 221b, the first edge 221a and the fourth edge 221b extends along the first direction D1, the first edge 221a is adjacent to the first edge 111a, and the fourth edge 221b is adjacent to the second edge 111b. The second shielding portion 222 comprises a second edge 222a and a fifth edge 222b, the second edge 222a and the fifth edge 222b extends along the first direction D1, the second edge 222a is adjacent to the third edge 112a, and the fifth edge 222b is adjacent to the fourth edge 112b. The third shielding portion 223 comprises a third edge 223a and a sixth edge 223b, the third edge 223a and the sixth edge 223b extends along the first direction D1, the third edge 223a is adjacent to the fifth edge 113a and the sixth edge 223b is adjacent to the sixth edge 113b.

In one embodiment of the present disclosure, the light shielding layer comprising the first shielding portion 221, the second shielding portion 222 and the third shielding portion 223 has plural openings 22a to define pixel regions Px. Herein, "the first shielding portion 221 overlapping the first conductive line 111" refers to the first shielding portion 221 overlapping the first conductive line 111 at a normal direction of the first substrate 11 (as shown in FIG. 3A), i.e. from the top views shown in FIG. 1 and FIG. 2A. Similarly, the definition of the second shielding portion 222 overlapping the second conductive line 112 and the definition of the third shielding portion 223 overlapping the third conductive line 113 are similar to that illustrated above, and are not repeated again.

As shown in FIG. 1 and FIG. 2A to FIG. 2C, at a second direction D2 perpendicular to the first direction D1, a distance between the first conductive line 111 and the first edge 221a (i.e. the first distance X1) is different from a distance between the second conductive line 112 and the second edge 222a (i.e. the third distance X3). Herein, the first edge 221a and the second edge 222a refer to the edges of the first shielding portion 221 and the second shielding portion 222 farther from the central point C or the central line L of the display area AA. However, in the situation shown in FIG. 2A, the distances between the edges of the first shielding portion 221 and the central point C or the central line L of the display area AA are approximately the same, so any one of the edges of the first shielding portion 221 can be considered as the first edge 221a, and the present disclosure is not limited to the situation shown in FIG. 2A. In one embodiment of the present disclosure, the first edge 221a is adjacent to the peripheral region Rp, and the second edge 222a is away from the central region Rc. In another embodiment of the present disclosure, the first edge 221a is adjacent to the second conductive line 112.

In other words, as shown in FIG. 1 and FIG. 2A to FIG. 2C, at the second direction D2 perpendicular to the first direction D1, there is a first distance X1 between the first edge 111a and the first edge 221a, there is a second distance X2 between the second edge 111b and the fourth edge 221b, there is a third distance X3 between the third edge 112a and the second edge 222a, and there is a fourth distance X4 between the fourth edge 112b and the fifth edge 222b. The difference between the first distance X1 and the second distance X2 is different from the difference between the third distance X3 and the fourth distance X4.

In the display device having the structure shown above in the present embodiment of the present disclosure, there is a shift between the conductive lines and the central lines of the shielding portions in different regions of the display area of the display device. Meanwhile, the distances between the shielding portions can be adjusted according to the curvature of the display device to be bent, so the distance between edges of the shielding portions and edges of the conductive lines in different regions are different. Therefore, when the display device is bended, the high aperture ratio of the display device can be maintained or the color points of chromaticity coordinates of the display device can be unchanged.

As shown in FIG. 1 and FIG. 2A to FIG. 2D, at the second direction D2 perpendicular to the first direction D1, the distance between the first conductive line 111 and the first edge 221a (i.e. the first distance X1) is greater than the distance between the second conductive line 112 and the second edge 222a (i.e. the third distance X3), and a difference between the first distance X1 and the second distance X2 is less than a difference between the third distance X3 and the fourth distance X4. In addition, in the present embodiment, a distance between the third conductive line 113 and the third edge 223a (i.e. the fifth distance X5) is less than the distance between the first conductive line 111 and the first edge 221a (i.e. the first distance X1), wherein the third edge 223a refers to an edge of the third shielding portion 223 farther from the central point C or the central line L of the display area AA. In other words, there is a fifth distance X5 between the fifth edge 113a and the third edge 223a, and there is a sixth distance X6 between the sixth edge 113b and the sixth edge 223b. The difference between the first distance X1 and the second distance X2 is less than the difference between the fifth distance X5 and the sixth distance X6.

In the present embodiment, the distance between the third conductive line 113 and the third edge 223a (i.e. the fifth distance X5) is greater than the distance between the second conductive line 112 and the second edge 222a (i.e. the third distance X3), and the difference between the third distance X3 and the fourth distance X4 is greater than the difference between the fifth distance X5 and the sixth distance X6. As shown in FIG. 2D and FIG. 3A, the third conductive line 113 and the third edge 223a are disposed in the edge region Re, which is adjacent to the non-display area B. In one embodiment of the present disclosure, the shift between the relative positions of the third conductive line 113 and the third shielding portion 223 is not too large due to the sealing element 3 on the non-display area B. Hence, when the third shielding portion 223 in the edge region Re is getting closer to the non-display area B, the difference between the fifth distance X5 and the sixth distance X6 is getting smaller.

In another embodiment of the present disclosure, two adjacent first conductive lines 111 are disposed in the central region Rc, and a pitch between the two adjacent first conductive lines 111 is defined as a first pitch Y1, wherein the pitch can be defined by the distance between the center of one of the first conductive lines 111 to the center of the other one of the first conductive lines 111 or can be defined by the distance between an edge of one of the first conductive lines 111 to a corresponding edge of the other one of the first conductive lines 111 at the same side. In addition, two adjacent first shielding portions 221 corresponding to the two adjacent first conductive lines 111 are disposed in the central region Rc, and a pitch between the two adjacent first shielding portions 221 is defined as a second pitch Y2, wherein the pitch can be defined by the distance between the center of one of the first shielding portions 221 to the center of the other one of the first shielding portions 221 or can be defined by the distance between an edge of one of the first shielding portions 221 to a corresponding edge of the other one of the first shielding portions 221 at the same side. Furthermore, two adjacent second conductive lines 112 are disposed in the peripheral region Rp, and a pitch between the two adjacent second conductive lines 112 is defined as a third pitch Y3. Two adjacent second shielding portions 222 corresponding to the two adjacent second conductive lines 112 are also disposed in the peripheral region Rp, and a pitch between the two adjacent second shielding portions 222 is defined as a fourth pitch Y4. The definitions of the pitches between the two adjacent second conductive lines 112 and between the two adjacent second shielding portions 222 are similar to those of the pitches between the two adjacent first conductive lines 111 and between the two adjacent first shielding portions 221, and are not repeated again.

Herein, a difference between the first pitch Y1 and the second pitch Y2 is defined as a first difference, a difference between the third pitch Y3 and the fourth pitch Y4 is defined as a second difference, and the first difference is different from the second difference. In some embodiments of the present disclosure, the first difference is less than the second difference.

In another embodiment of the present disclosure, two adjacent first conductive lines 111 are disposed in the central region Rc, and a distance between the two adjacent first conductive lines 111 is a first gap. Two adjacent first shielding portions 221 corresponding to the two adjacent first conductive lines 111 are also disposed in the central region Rc, and a distance between the two adjacent first shielding portions 221 is a second gap. Two adjacent second conductive lines 112 are disposed in the peripheral region Rp, and a distance between the two adjacent second conductive lines 112 is a third gap. Two adjacent second shielding portions 222 corresponding to the two adjacent second conductive lines 112 are also disposed in the peripheral region Rp, and a distance between the two adjacent second shielding portions 222 is a fourth gap. A difference between the first gap and the second gap is defined as a first difference, a difference between the third gap and the fourth gap is defined as a second difference, and the first difference is different from the second difference.

FIG. 3A and FIG. 3B are respectively cross-sectional views of the display device of the present embodiment before and after the display device is bent. When the display device of the present embodiment has the aforesaid structure, before bending the display device, as shown in FIG. 3A, shifts between the first conductive lines 111 and the first shielding portions 221 in the central region Rc, between the second conductive lines 112 and the second shielding portions 222 in the peripheral region Rp and between the third conductive line 113 and the third shielding portion 223 in the edge region Re are designed according to the curvatures to be obtained. After bending the display device, as shown in FIG. 3B, no shift is present between the first conductive lines 111 and the first shielding portions 221 in the central region Rc, between the second conductive lines 112 and the second shielding portions 222 in the peripheral region Rp and between the third conductive line 113 and the third shielding portion 223 in the edge region Re.

In addition, as shown in FIG. 2A to FIG. 2D, in the display device of the present embodiment, a sum of the first distance X1 and the second distance X2 is equal to the sum of the third distance X3 and the fourth distance X4, and also equal to the sum of the fifth distance X5 and the sixth distance X6. Hence, the display device of the present embodiment has the advantage of high aperture ratio or unchanged color points of chromaticity coordinates.

In some embodiment of the present discourse, the display device is bent toward a direction from the second substrate 21 to the first substrate 11, so the design of the distances between the conductive lines and the edges of the shielding portions are contrary to those shown in FIG. 2A to FIG. 2D. For example, when the display device is bent toward a direction from the second substrate 21 to the first substrate 11, the third distance X3 is greater than the fourth distance X4 in the region R2. The distances between the conductive lines and the edges of the shielding portions in the region R1, the region R3 and the region R4 may be deduced by analogy.

Herein, a 27-inch curved display device with a single value of the assembling allowance is exemplified. It is assumed that the maximum shift between the conductive lines and the shielding portions is 14 µm after the bending of the curved display device is completed; in this case, the first distance X1 to the sixth distance X6 are designed to be 14 µm in any region of the display area, and the aperture ratio of the obtained curved display device is about 36.75%. However, in the 27-inch curved display device with the structure of the present disclosure, the first distance X1 and the second distance X2 can be designed to be 7 µm, the maximum value of the fourth distance X2 is less than 14 µm, and the minimum value of the third distance X3 is more than 0 µm; in this case, the aperture ratio of the obtained curved display device can be increased to about 57.40%.

In the present embodiment, the first conductive lines 111, the second conductive lines 112 and the third conductive line 113 are data lines in FIG. 1 to FIG. 3B. However, the present disclosure is not limited thereto. In another embodiment of the present disclosure, the first conductive lines 111, the second conductive lines 112 and the third conductive line 113 can be scan lines. When the first conductive lines 111, the second conductive lines 112 and the third conductive line 113 are scan lines, the shifts between the scan lines and the shielding portions can be designed as those stated above, and are not repeated again.

As shown in FIG. 3A and FIG. 3B, the display device is bent toward a direction from the first substrate 11 to the second substrate 21. In the curved display device obtained after the bending process, the central region Rc is a relative smooth region, which has the smallest curvature (i.e. having the largest radius of curvature); the peripheral region Rp is a relative curved region, which has the largest curvature (i.e. having the smallest radius of curvature); and the curvature (or the radius of curvature) of the edge region Re is approximately between those of the central region Rc and the peripheral region Rp. Herein, the central region Rc can be considered as a first region with a larger radius of curvature, and the peripheral region Rp or the edge region Re can be considered as a second region with a smaller radius of curvature. Alternately, the peripheral region Rp can be considered as a second region with a smaller radius of curvature, and the edge region Re can be considered as a first region with a larger radius of curvature. In addition, in one embodiment of the present disclosure, the display device can comprise a flat region and a curved region, and no shift between the conductive lines and the shielding portions is designed in the flat region. In another embodiment of the present disclosure, the display device may comprise plural curved regions. These curved regions may have different radiuses of curvature or different bending directions (for example, the direction from the first substrate 11 to the second substrate 21 or the direction from the second substrate 21 to the first substrate 11).

In some embodiment of the present disclosure, the display area of the display device comprises a first region and a second region, and a radius of curvature of the first region is greater than a radius of curvature of the second region. Two adjacent conductive lines are disposed in the first region, and a pitch between the two adjacent conductive lines is defined as a first pitch, wherein the pitch can be defined by the distance between the center of one of the two adjacent conductive lines to the center of the other one of the two adjacent conductive lines or can be defined by the distance between an edge of one of the two adjacent conductive lines to a corresponding edge of the other one of the two adjacent conductive lines at the same side. Two adjacent shielding portions corresponding to the conductive lines are also disposed in the first region, and a pitch between the two adjacent shielding portions is defined as a second pitch. Two adjacent conductive lines are disposed in the second region, and a pitch between the two adjacent conductive lines is defined as a third pitch. Two adjacent shielding portions corresponding to the conductive lines are also disposed in the second region, and a pitch between the two adjacent shielding portions is defined as a fourth pitch. A difference between the first pitch and the second pitch is defined as a first difference, a difference between the third pitch and the fourth pitch is defined as a second difference, and the first difference is different from the second difference. In some embodiments of the present disclosure, the first difference is less than the second difference.

In another embodiment of the present disclosure, the display area of the display device comprises a first region and a second region, and a radius of curvature of the first region is greater than a radius of curvature of the second region. Two adjacent conductive lines are disposed in the first region, and a distance between the two adjacent conductive lines is defined as a first gap. Two adjacent shielding portions corresponding to the conductive lines are also disposed in the first region, and a distance between the two adjacent shielding portions is defined as a second gap. Two adjacent conductive lines are disposed in the second region, and a distance between the two adjacent conductive lines is defined as a third gap. Two adjacent shielding portions corresponding to the conductive lines are also disposed in the second region, and a distance between the two adjacent shielding portions is defined as a fourth gap. A difference between the first gap and the second gap is defined as a first difference, a difference between the third gap and the fourth gap is defined as a second difference, and the first difference is different from the second difference. In some embodiments of the present disclosure, the first difference is less than the second difference.

It should be noted that the radiuses of curvature stated above can be the radiuses of curvature measured in the first region or the second region on the same surface of the first substrate 11. Alternately, the radiuses of curvature stated above can be the radiuses of curvature measured in the first region or the second region on the same surface of the second substrate 21.

Embodiment 2

Figure 4:
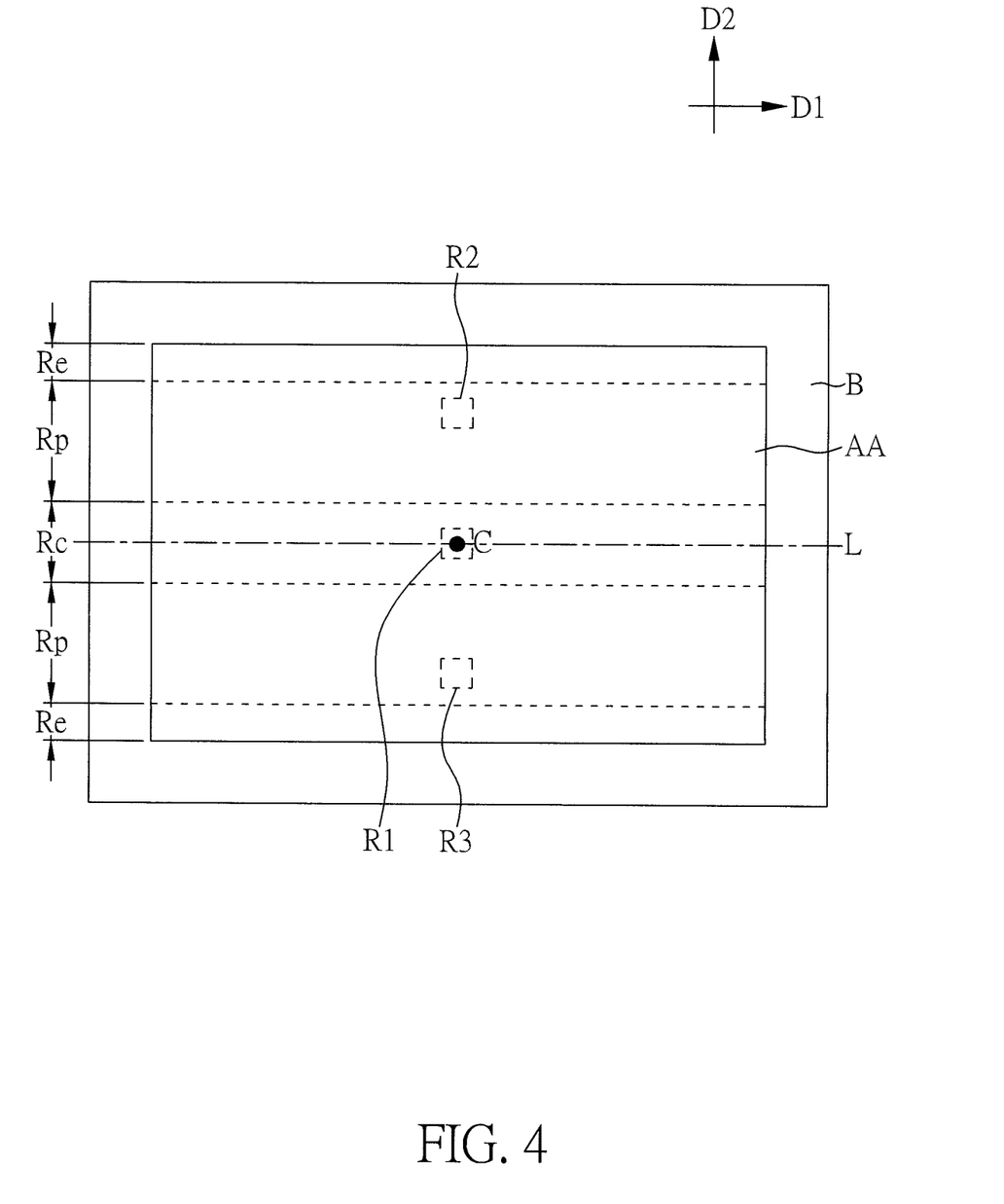
FIG. 4 is a top view of a display device according to Embodiment 2 of the present disclosure.

FIG. 4 is a top view of a display device of the present embodiment. The display device of the present embodiment is similar to that of Embodiment 1, except that the shifts between the conductive lines and the shielding portions is the shifts between the scan lines and the shielding portions in the present embodiment. The definitions of the central region Re, the peripheral region Rp and the edge region Re in the display device of the present embodiment are similar to those stated in Embodiment 1, and are not repeated again.

Figure 5A:
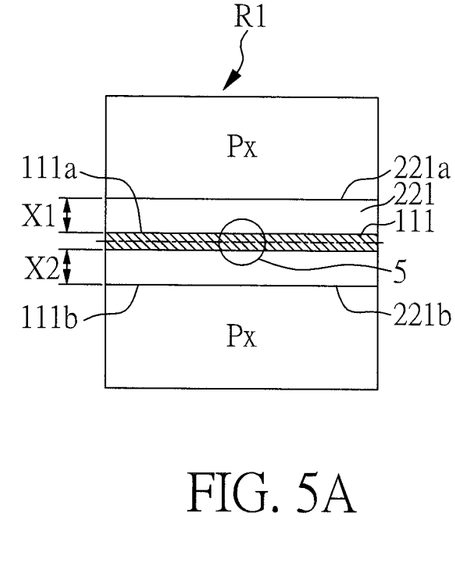
FIG. 5A, FIG. 5B and FIG. 5C are enlarged views of different regions of the display device of FIG. 4.
Figure 5B:
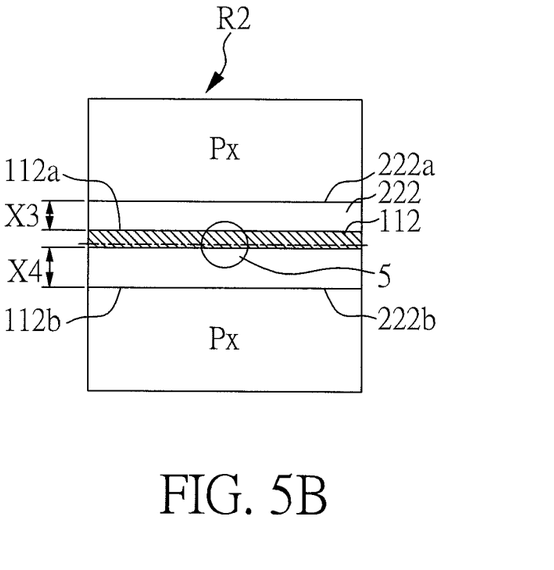
Figure 5C:
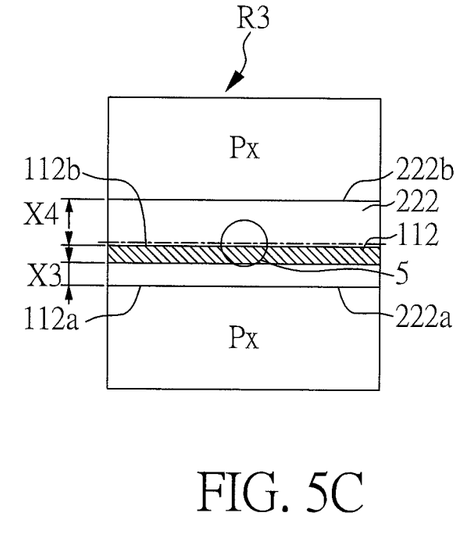

FIG. 5A, FIG. 5B and FIG. 5C are enlarged views of different regions of the display device of FIG. 4. The design of FIG. 5A can be referred to the design of FIG. 2A and the designs of FIG. 5B and FIG. 5C can be referred to the designs of FIG. 2B and FIG. 2C. Herein, the designs of FIG. 5A to FIG. 5C are not repeated again. In addition, as shown in FIG. 5A and FIG. 5C, the display device of the present embodiment further comprising spacers 5, disposed between the first conductive line 111 and the first shielding portion 221 and between the second conductive line 112 and the second shielding portion 222. When the user does not grab the display device, the centers of the spacers correspond to the centers of the first conductive line 111 and the second conductive line 112 or the centers of the first shielding portion 221 and the second shielding portion 222.

FIG. 5B' is an enlarge view of a region of the display device when a user grabs the display device. When the user grabs the display device, the pressure applied from the user may cause one side of the spacer 5 facing to the first substrate to shift. In this case, the alignment layer in the display layer may be damaged, resulting in the light leakage. However, in the present embodiment, when the user grabs the region R2, the position of one side of the spacer 5 may be moved from the position shown in FIG. 5B to the position shown in FIG. 5B'. When the user grabs the display device upward along the second direction D2, even though one side of the spacer 5 facing to the first substrate shifts downward along the second direction D2 and damages the display layer, the second shielding portion 222 can shied the damaged alignment layer by designing the third distance X3 less than the fourth distance X4 in the display device of the present embodiment. Thus, the problem of the light leakage can be prevented.

In the embodiments of the present disclosure, the number of the conductive lines and the shielding portions are only used for explanation. The number of the conductive lines and the shielding portions are not limited thereto.

The display device made as described in any of the embodiments of the present disclosure as described previously could be co-used with a touch panel to obtain a touch display device. Meanwhile, the display device or the touch display device may be applied to any electronic devices known in the art that need a display screen, such as displays, wearable electronic device, mobile phones, laptops, video cameras, still cameras, music players, mobile navigators, TV sets, household appliances, market appliances, public appliances, electrical equipment or other electronic devices that display images.

Although the present disclosure has been explained in relation to its embodiment, it is to be understood that many other possible modifications and variations can be made without departing from the spirit and scope of the disclosure as hereinafter claimed.

What is claimed is:

1. A display device comprising a display area, wherein the display area comprises a central region and a peripheral region, and the display device comprises:
    a first conductive line disposed in the central region and extending along a first direction;
    a second conductive line disposed in the peripheral region and extending along the first direction;
    a first shielding portion overlapping the first conductive line and comprising a first edge, wherein the first edge extends along the first direction, and the first edge is adjacent to the second conductive line; and
    a second shielding portion overlapping the second conductive line and comprising a second edge, wherein the second edge extends along the first direction, and the second edge is away from the central region,
    wherein a distance between the first conductive line and the first edge is greater than a distance between the second conductive line and the second edge,
    wherein the central region is disposed at a center of the display area and the peripheral region is disposed to be adjacent to the central region.

2. The display device of claim 1, wherein the display area further comprises an edge region, the peripheral region is disposed between the central region and the edge region, and the display device further comprises:
    a third conductive line disposed in the edge region and extending along the first direction; and
    a third shielding portion overlapping the third conductive line and comprising a third edge, wherein the third edge extends along the first direction, and the third edge is away from the central region,
    wherein a distance between the third conductive line and the third edge is less than the distance between the first conductive line and the first edge, and the distance between the third conductive line and the third edge is greater than the distance between the second conductive line and the second edge.

3. The display device of claim 1, wherein the first conductive line and the second conductive line respectively are data lines.

4. The display device of claim 2, wherein the third conductive line is a data line.

5. The display device of claim 1, wherein the first conductive line and the second conductive line respectively are scan lines.

6. The display device of claim 2, wherein the third conductive line is a scan line.

7. The display device of claim 1, wherein the distance between the first conductive line and the first edge is greater than the distance between the second conductive line and the second edge when the display device is not bent.

8. A display device comprising a display area, wherein the display area comprises a central region and a peripheral region, and the display device comprises:
    two first conductive lines disposed in the central region and extending along a first direction, wherein the first conductive lines are adjacent to each other;
    two second conductive lines disposed in the peripheral region and extending along the first direction, wherein the second conductive lines are adjacent to each other;
    two first shielding portions respectively overlapping the first conductive lines; and
    two second shielding portions respectively overlapping the second conductive lines,
    wherein a difference between a pitch of the first conductive lines and a pitch of the first shielding portions is defined as a first difference, a difference between a pitch of the second conductive lines and a pitch of the second shielding portions is defined as a second difference, and the first difference is different from the second difference, and
    wherein the central region is disposed at a center of the display area and the peripheral region is disposed to be adjacent to the central region.

9. The display device of claim 8, wherein the first difference is less than the second difference.

10. The display device of claim 8, wherein the first conductive lines and the second conductive lines respectively are data lines.

11. The display device of claim 8, wherein the first conductive lines and the second conductive lines respectively are scan lines.

12. The display device of claim 8, wherein the first difference is different from the second difference when the display device is not bent.

13. A display device comprising a display area, wherein the display area comprises a first region and a second region, a radius of curvature of the first region is greater than a radius of curvature of the second region, and the display device comprises:
    two first conductive lines disposed in the first region and extending along a first direction, wherein the first conductive lines are adjacent to each other;
    two second conductive lines disposed in the second region and extending along the first direction, wherein the second conductive lines are adjacent to each other;
    two first shielding portions respectively overlapping the first conductive lines; and
    two second shielding portions respectively overlapping the second conductive lines,
    wherein a difference between a pitch of the first conductive lines and a pitch of the first shielding portions is defined as a first difference, a difference between a pitch of the second conductive lines and a pitch of the second shielding portions is defined as a second difference, and the first difference is different from the second difference, and
    wherein the first region is disposed at a center of the display area and the second region is disposed to be adjacent to the first region.

14. The display device of claim 13, wherein the first difference is less than the second difference.

15. The display device of claim 13, wherein the first conductive lines and the second conductive lines respectively are data lines.

16. The display device of claim 13, wherein the first conductive lines and the second conductive lines respectively are scan lines.

17. The display device of claim 13, wherein the radius of curvature of the first region is greater than the radius of curvature of the second region when the display device is bent.

18. The display device of claim 13, wherein the first difference is different from the second difference when the display device is not bent.

* * * * *